June 20, 1961 R. KUHNERT ET AL 2,988,954
MAGAZINE-TYPE DEVICE FOR MAGNETICALLY RECORDING AND/OR TRANSMITTING
SOUND IN SYNCHRONOUS OPERATION WITH A SEPARATE DEVICE
FOR TAKING OR PROJECTING MOTION PICTURES
Filed Dec. 6, 1956
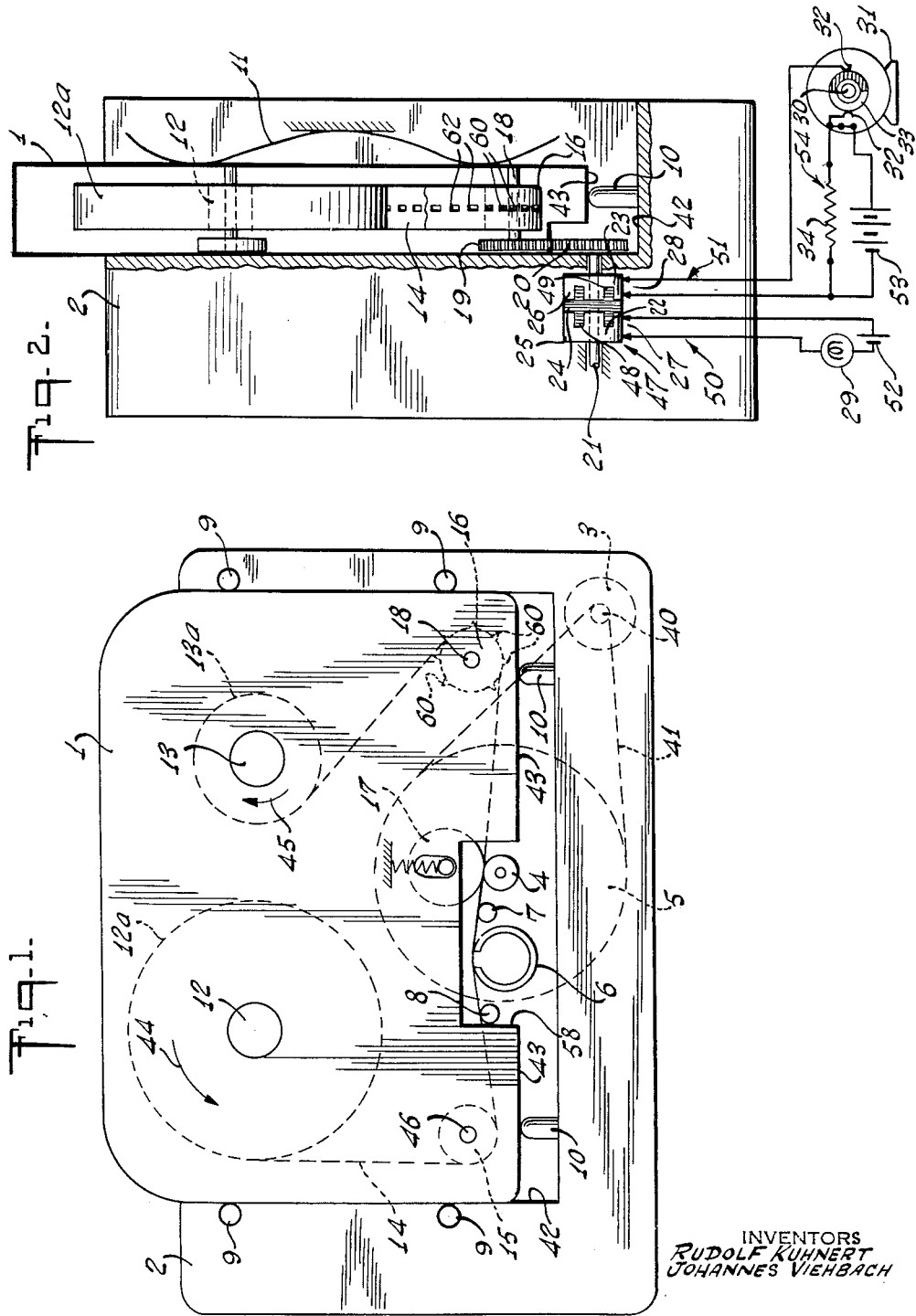
INVENTORS
RUDOLF KUHNERT
JOHANNES VIEHBACH United States Patent Office 2,988,954
Patented June 20, 1961

2,988,954
MAGAZINE-TYPE DEVICE FOR MAGNETICALLY RECORDING AND/OR TRANSMITTING SOUND IN SYNCHRONOUS OPERATION WITH A SEPARATE DEVICE FOR TAKING OR PROJECTING MOTION PICTURES
Rudolf Kuhnert and Johannes Viehbach, Dresden, Germany, assignors to VEB Kamera- und Kinowerke Dresden
Filed Dec. 6, 1956, Ser. No. 626,680
3 Claims. (Cl. 88—16.2)

This invention relates to a device for magnetically recording or reproducing sound in combination with a separate device for taking or projecting motion pictures, and more particularly to a device generating electrical impulses for synchronizing the movement of a sound tape retained in an interchangeable magazine with the rate of movement of a motion picture film.

An object of the invention is to provide a magazine-type magnetic sound recording or reproducing device of above described type by means of which a perfect synchronism with a motion picture camera and/or motion picture projector is assured, so that a lip-synchronous taking or projecting of motion pictures can be obtained.

Another object of the invention is to provide a magazine-type magnetic sound recorder and/or transmitter for synchronous operation with a motion picture camera and/or motion picture projector, which can be readily manufactured and is convenient in use.

Other objects and advantages of the present invention will become apparent from the following detailed description thereof in connection with the accompanying drawings, showing by way of example, an embodiment of the present invention.

In the drawings:

FIG. 1 is a plan view of a sound recorder or transmitter according to the present invention for synchronized operation in combination with a separate picture taking or projecting device, and FIG. 2 is a somewhat diagrammatical side elevational view, partly in section, of the apparatus shown in FIG. 1, with some additional devices.

Referring now to the drawings: A housing 2 capable of receiving a magazine 1 for a perforated sound carrier or tape 14 contains a driving electric motor 3 having a shaft 40 connected by a belt or chain 41 with a flywheel 5 or the like rotatably mounted in said housing 2. Said flywheel 5 is rigidly connected with a tape advancing or driving roller 4 coaxially arranged thereto and capable of advancing the sound carrier or tape 14. The sound carrier 14 is guided by two guiding elements 7, 8, arranged in said housing 2 respectively at opposite sides of a magnetic scanning head 6. During the insertion of the magazine 1 into a recess 42 of the housing 2 the magazine 1 is guided by a plurality of guide rollers 9 arranged in the housing 2. The end position of the magazine 1 in the housing 2 is defined by abutting pins 10 arranged in the housing 2 for abutting engagement with the edge 43 of the magazine 1. Furthermore, the magazine 1 is held in the inserted position thereof by a spring 11 (FIG. 2) arranged in the housing 2. Moreover, the housing contains the source (not shown) of energy for the driving motor 3 and the amplifying set (not shown) for amplifying the sound oscillations.

A wind-off core or shaft 12 and a wind-up core or shaft 13 capable of receiving reels 12a and 13a respectively for the perforated sound carrier 14 are mounted in the magazine 1. The wind-off reel 12a rotates in the direction of the arrow 44, whereas the wind-up reel 13a rotates in the direction of the arrow 45. The perforated sound carrier or tape 14 is trained around an idling roller 15 rotatably mounted in the magazine at 46. After passage through a cut-out 58 of the magazine 1, the perforated tape 14 is trained around a rotatable roller or drum 16 being arranged in the magazine 1 and having a series of teeth 60 for engagement with the perforations 62 (see FIG. 2) of the tape 14. The roller 16 is rigidly connected with a shaft 18, which in turn is rigidly connected with a gear 19. When the magazine 1 is inserted into the housing 2, a pressure roller 17, resiliently supported in the magazine 1, presses the sound carrier or tape 14 against the driving roller 4 mounted in the housing 2 for projection into the cut-out 58 of the magazine 1 and the gear 19 meshes with a gear 20 keyed to an axle 21 rotatably mounted in the housing 2. Said axle 21 is rigidly connected with an electrical collector means or impulse generator generally denoted by 47 and including the two halves 22, 23 of a metal cylinder separated electrically by an insulating disk 24. The insulating stems, such as 48, 49 forming the side extensions of the disk 24, subdivide the halves 22, 23 of the metal cylinder, on a part of their surface, into contact segments 25, 26, forming together with the pairs of contact brushes 27, 28, two interrupting circuits denoted generally by 50 and 51, respectively.

The operation of this device is as follows:

The magazine 1 is inserted into the housing 2 as shown in the drawings. Then the driving motor 3 is energized so as to drive the flywheel 5 by the belt or chain 41, whereby the driving roller 4 advances the perforated sound carrier or tape 14 and the latter is wound off from the reel 12a, and wound on the reel 13a. The sound carrier 14 cooperates thereby with the scanning head 6 and, after passing between the driving roller 4 and the pressure roller 17, the perforated sound carrier or tape 14 drives by the perforations 62 thereof the synchronizing means or toothed roller 16, which in turn causes a rotation of the impulse generator 47 through the coupling gear 19 meshing with the gear 20. The interrupting circuit 50 including the half 22 of the impulse generator 47 includes in series connection a signal lamp 29 and an electric source, such as a battery 52. The flashing of the signal lamp 29 indicates the orderly operation of the means advancing the sound carrier or tape 14. The other interrupting circuit 51 including the contact segments 26 and the pair of contact brushes 28 serves, in connection with an interrupting device comprising a pair of contact brushes 32 and a contact segment 33 mounted on the shaft 30 of a driving motor 31 for the picture taking device (not shown), for a periodical short-circuiting of a resistor 34 arranged in parallel to the battery 53 in the main circuit generally denoted by 54 of the driving motor 31, thus establishing synchronism between the sound carrier or tape 14 and the motion picture film (not shown).

It is understood that the features according to the invention may be applied to a magazine-type magnetic sound recorder or to a magazine-type magnetic sound transmitter or to a magazine-type magnetic sound recorder and transmitter.

We have described a preferred embodiment of our invention, but it is understood that this disclosure is for the purpose of illustration, and that various changes in shape and proportion, as well as the substitution of equivalent elements for those herein shown and described may be made without departing from the spirit and scope of the invention as set forth in the appended claims.

What we claim is:

1. An arrangement for synchronizing a sound storage device to a motion picture apparatus comprising a housing, a magazine insertable and removable from said housing, spring means adapted to retain said magazine in said housing, a perforated sound carrier tape adapted for movable operation on said magazine, a sprocket on said magazine engageable with perforations of said tape and responsive only to motion of said tape, a first gear mounted in said magazine for rotation with said sprocket, magnetic pick-up means in said housing, a second gear mounted on said housing adapted to engage said first gear upon insertion of said magazine in said housing, means in said housing for frictionally providing movement of said tape when said magazine is inserted, said moving means being independent of said sprocket, means on said magazine for biasing said tape to said last-named means upon insertion of magazine into said housing, commutator means in said housing coaxially mounted with said second gear including a drum having a plurality of contact surfaces for providing both intermittent and constant electrical contact and motor control means electrically connected to said commutator means.

2. In an apparatus wherein a sound tape mechanism receives a magazine containing a spool of magnetic tape to be frictionally driven by drive means in the sound mechanism, and wherein the sound recorded on the tape is synchronized to the motion of a strip of film in a distant motion picture apparatus by means of an electrical commutator, the improvement which comprises a freely rotatable sprocket wheel in the removable magazine in engagement with the tape and otherwise independent of the movement of the drive means for movement by the tape, a spur gear keyed to said sprocket wheel and projecting out of the magazine and into the mechanism, a driven gear mounted on the mechanism and in engagement with said spur gear when the magazine is mounted in the mechanism, and means mechanically connecting said driven gear to the commutator, whereby the actual speed of the tape is positively transmitted to the commutator.

3. In an apparatus wherein a sound tape mechanism receives a magazine containing a spool of magnetic tape to be frictionally driven by drive means in the sound mechanism, and wherein the sound recorded on the tape is synchronized to the motion of a strip of film in a distant motion picture apparatus by means of an electrical commutator, the improvement which comprises a freely rotatable sprocket wheel in the removable magazine in engagement with the tape and otherwise independent of the movement of the drive means for movement by the tape, and means keyed to said sprocket wheel and projecting from the magazine for positively driving the commutator upon insertion of the magazine in the mechanism, whereby the actual speed of the tape is positively transmitted to the commutator.

References Cited in the file of this patent

UNITED STATES PATENTS

| | | |
|---|---|---|
| 2,275,497 | Berndt | Mar. 10, 1942 |
| 2,466,124 | Owens | Apr. 5, 1949 |
| 2,539,521 | Owens | Jan. 30, 1951 |
| 2,604,321 | Williams | July 22, 1952 |
| 2,661,162 | Owens | Dec. 1, 1953 |
| 2,697,754 | Ranger | Dec. 21, 1954 |

FOREIGN PATENTS

| | | |
|---|---|---|
| 341,152 | Great Britain | Jan. 15, 1931 |
| 359,162 | Great Britain | Oct. 22, 1931 |
| 478,481 | Great Britain | Jan. 19, 1938 |
| 62,655 | France | Feb. 2, 1955 |
| | (1st addition to No. 1,047,422) | |
| 1,101,732 | France | Apr. 27, 1955 |